(12) United States Patent
Stockman

(10) Patent No.: US 8,350,530 B2
(45) Date of Patent: Jan. 8, 2013

(54) AIRCRAFT BATTERY CHARGING SYSTEM HAVING TWO VOLTAGE REGULATORS

(76) Inventor: Gregg Stockman, Allenton, MI (US)

( * ) Notice: Subject to any disclaimer, the term of this patent is extended or adjusted under 35 U.S.C. 154(b) by 504 days.

(21) Appl. No.: 12/535,932

(22) Filed: Aug. 5, 2009

(65) Prior Publication Data

US 2011/0031933 A1   Feb. 10, 2011

(51) Int. Cl.
*H02J 7/00* (2006.01)
(52) U.S. Cl. ........................................ 320/137
(58) Field of Classification Search .................. 320/137
See application file for complete search history.

(56) References Cited

U.S. PATENT DOCUMENTS

| 6,005,372 A * | 12/1999 | Kouwa et al. ............... 322/25 |
| 2009/0105522 A1 * | 4/2009 | Yi et al. ........................ 600/13 |
| 2009/0206600 A1 * | 8/2009 | Horie et al. .................. 290/2 |

\* cited by examiner

*Primary Examiner* — Arun Williams
(74) *Attorney, Agent, or Firm* — Gifford, Krass, Sprinkle, Anderson & Citkowski, P.C.

(57) ABSTRACT

An aircraft battery charging system having an alternator with a rotatably driven field coil and a stator coil in which the stator coil is connected to a voltage output from the alternator. The system includes a power source, a first voltage regulator and a second voltage regulator. A switch mechanism selectively connects one of the first or second voltage regulators to one end of the field coil.

8 Claims, 2 Drawing Sheets

AIRCRAFT BATTERY CHARGING SYSTEM HAVING TWO VOLTAGE REGULATORS

BACKGROUND OF THE INVENTION

I. Field of the Invention

The present invention relates to a battery charging system for an aircraft having an alternator.

II. Description of Related Art

Most power driven general aviation aircraft have only one engine. Reliable electric power, however, is vital to the proper operation of the aircraft. Such electrical power is necessary not only to operate many of the controls of the aircraft, but also to communicate with Air Traffic Control, obtain in flight weather information, detect other airborne aircraft, as well as monitor and maintain engine operating conditions.

In most propeller driven general aviation aircraft, the engine motor rotatably drives a field coil of an alternator. A stator coil surrounds the field coil and provides the alternating current output from the alternator. This alternating current, however, is then rectified into DC current which is then used to charge the battery which in turn provides electrical power for the aircraft.

In order to control the output voltage from the alternator, a current is supplied through the field winding wherein the magnitude of the field current in turn varies the DC output voltage from the alternator. In order to control this current, typically a voltage regulator is electrically connected in series between the power supply and one end of the field coil. The other end of the field coil is, in turn, grounded.

Due to both weight and room considerations, most general aviation aircraft do not include redundant batteries or redundant alternators. As such, failure of the electrical system, and the battery charging system, occasionally occurs. Such failures render the aircraft difficult or even impossible to aviate.

Most electrical failures of such aircraft result from one of the following five causes:
1. A defective voltage regulator;
2. An open or broken field winding;
3. A short circuit of the alternator field winding;
4. A defective brush for the alternator field coil; or
5. A defective alternator field winding.

SUMMARY OF THE PRESENT INVENTION

The present invention provides a battery charging system for an aircraft which overcomes the above-mentioned disadvantages of the prior art systems.

In brief, the electrical system of the present invention, like the previously known electrical systems, is intended for use with an alternator having a rotatably driven field coil within a stator coil. The outputs from the stator coil are connected through a rectifier block which converts the alternating current output to a direct current output from the alternator. These stator outputs are then connected to the battery in order to charge it.

In order to control the electrical output voltage from the alternator, electrical power is selectively connected through a first voltage regulator to one end of the field winding while the other end of the field winding or coil is grounded. Consequently, the voltage regulator, by controlling the current flow through the field winding, controls the voltage output from the alternator.

Unlike the previously known aircraft electrical systems, however, the present invention provides a second voltage regulator in parallel with the first voltage regulator. Consequently, in the event of a failure of one of the voltage regulators, a switch enables the pilot to select the other voltage regulator and thus maintain operation of the engine electrical systems.

Preferably, the voltage settings for the two voltage regulators differ from each other This enables the pilot to select a lower or higher charging voltage within the voltage operating range of the battery in order to accommodate different engine operating conditions and requirements.

Preferably a first diode is electrically connected in series with the first voltage regulator while, similarly, a second diode is electrically connected in series between the second voltage regulator and the field winding. Thus, in the event of a short or break in the wire connecting the voltage regulator to the field winding, the diodes permit continued operation of the electrical system as desired.

In still a further modification of the present invention, a second field winding is wound within the alternator. The first voltage regulator is connected to the first field winding while, conversely, the second voltage regulator is selectively connected to the second field winding. Consequently, in the event of failure of either of the field windings, the pilot may switch to the other voltage regulator and maintain continued operation of the electrical system for the aircraft.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
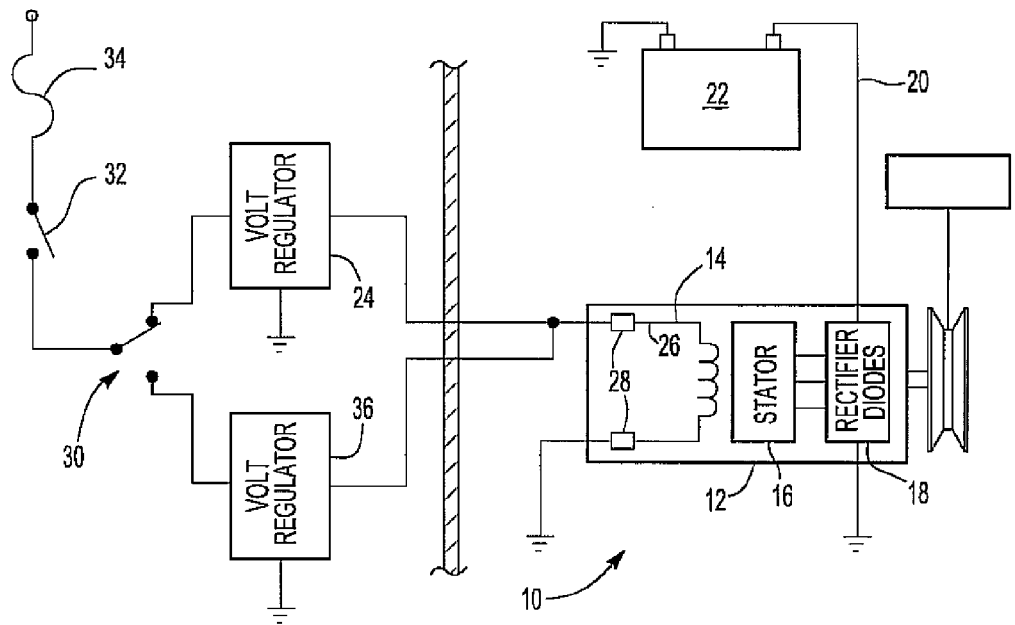
FIG. 1 is a schematic diagram of a first preferred embodiment of the present invention.

With reference first to FIG. 1, a first preferred embodiment of the electrical battery charging system 10 of the present invention is illustrated. The system includes an alternator 12 having a field coil or winding 14. The field coil 14 is rotatably driven by the aircraft engine and is rotatably mounted within and adjacent a stator coil 16. The outputs from the stator coil 16 are then electrically connected through a diode rectifier block 18 which provides a DC voltage output on an output line 20 from the rectifier block 18. This output line 20 is then connected to and recharges a battery 22 for the aircraft.

The output voltage needed to charge the battery 22 is typically given in a voltage range, e.g. 13.6 volts to 14.3 volts. A voltage less than that range is insufficient to charge the battery while an over voltage above 14.3 volts can damage the battery.

The current through the field coil 14 is varied in order to control the voltage output on output line 20 from the rectifier block 18. In order to vary the field coil current, a voltage regulator 24 is electrically connected to one end 26 of the field coil 14 through electrical brushes 28. An input to the voltage regulator is electrically selectively connected by a SPDT selector switch 30, on-off switch 32 and circuit breaker 34 to a source of electrical power, typically the battery 22.

Still referring to FIG. 1, a second voltage regulator 36 also has its input connected to the output of the single pole double throw switch 30 and its output connected to the end 26 of the field coil 14 through the brushes 28. The other end of the field coil 14 is connected to ground.

In operation, after closure of the on-off switch 32, the pilot may selectively switch between the first voltage regulator 24 and the second voltage regulator 36 depending upon the needs of the aircraft and the electrical system for the aircraft. Consequently, even in the event of failure of one of the voltage regulators, or a break in the line between the voltage regulator 24 or 36 and the field coil 14, continued operation of the electrical system may be maintained by simply switching to the other voltage regulator.

Preferably, the voltage regulators 24 and 36 are set at different voltage points. Preferably, the first voltage regulator 24 is set to the lower threshold plus one third of the range for the battery recharging voltage. Conversely, the second voltage regulator 36 is set to the lower threshold of the battery charging range plus two thirds of the range, and thus higher than the first voltage regulator 24. By so setting the voltage levels for the voltage regulators 24 and 36, either voltage regulator 24 or 36 may be safely used while maintaining the output from the voltage regulators 24 and 36 within the battery charging range.

For example, for a battery having a charging range of 13.6 to 14.3 volts, the voltage for the first voltage regulator 24 is set by the following formula:

Set point=13.6 volts+(0.333×(14.3 volts−13.6 volts))

or

Set point=13.8 volts whereas the voltage for the second regulator is set by the following formula:

Set point=13.6 volts+(0.666×(14.3 volts−13.6 volts))

or

Set point=14.1 volts

There are several aircraft operating conditions where it is desirable to charge the battery at a higher voltage than a lower voltage, and vice versa. For example, if an aircraft has been started for the purpose of moving it on the ground, very little time is available to recharge the battery after starting the engine. In that situation, a higher voltage setting will be desirable to increase the rate that the battery is recharged.

Similarly, at extremely low battery temperatures, the low charging voltage may not supply enough electrical current to charge the battery adequately so that a higher voltage setting from the second regulator 36 may be desirable.

Conversely, during long flights with lead acid batteries, selecting the regulator 24 having the lower voltage setting will decrease the rate at which gases are released from the battery and, by doing so, prolong the life of the battery. Similarly, a lower battery voltage is desirable at high battery temperatures which protects the battery against excess current which may damage the battery due to sulfation.

Figure 2:
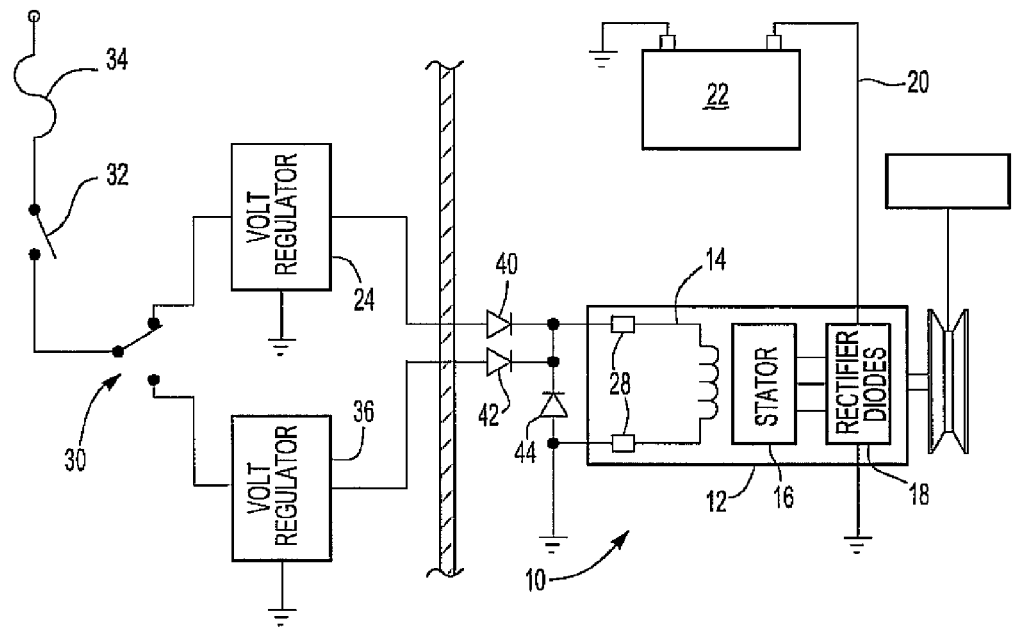
FIG. 2 is a schematic diagram of a second preferred embodiment of the present invention.

With reference now to FIG. 2, a modification of the present invention is shown in which a first diode 40 is connected in series between the first voltage regulator 24 and the brushes 28 for the field coil 14. Similarly, a second diode 42 is electrically connected between the second voltage regulator 36 and the brushes 28 for the field coil 14. A third diode 44 is optionally connected between the ends of the brushes 28 for the field coil 14.

In the event of a short circuit of either electrical connection between the voltage regulator 24 or 36 and the field coil 14 for the alternator 12, the diodes 40 and 42 allow the pilot to simply switch between voltage regulators 24 and 36 by using the selector switch 30 whereupon the diode 42 or 40 would isolate the electrical short from the electrical system. The third diode 44 would prevent any counter electrical forces that the field winding 14 may produce.

Figure 3:
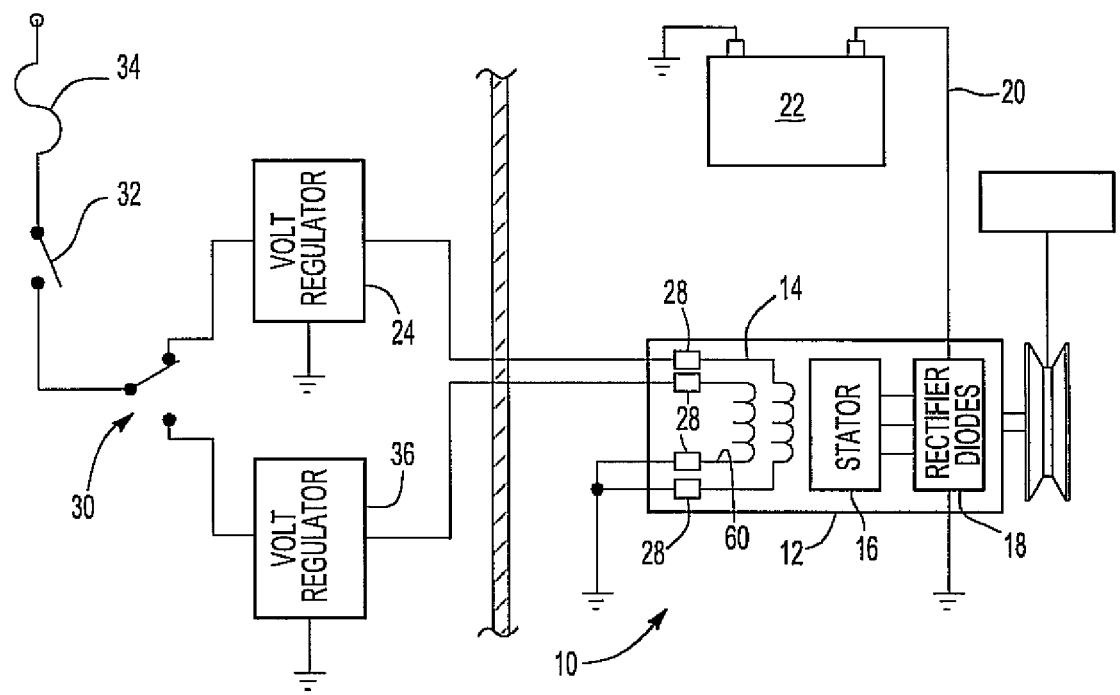
FIG. 3 is a schematic diagram of a third preferred embodiment of the present invention.

With reference now to FIG. 3, a still third preferred embodiment of the present invention is shown. FIG. 3 is identical to the embodiment of FIG. 1 except that a second field coil 60 is contained within the alternator 12. One end of the second field coil 60 is connected to the output from the second voltage regulator 36 while the output from the first voltage regulator 24 is connected to one end of the first field winding 14. Brushes 28 are used to electrically connect the voltage regulators 24 and 36 to their respective field coils 14 and 60 while the other ends of the field coils 14 and 60 are both electrically connected to ground.

In the event of a short, open or other failure of one of the field coils 14 or 60, the pilot may simply switch to the other field by moving the selector switch 30 and then maintain continued operation of the electrical charging system for the aircraft.

From the foregoing, it can be seen that the present invention provides a simple and yet highly effective mechanism to prevent the failure of the battery charging system for general aviation aircraft. Having described my invention, however, many modifications thereto will become apparent to those skilled in the art to which it pertains without deviation from the spirit of the invention as defined by the scope of the appended claims.

I claim:

1. An aircraft battery charging system comprising:
an alternator having a rotatably driven field coil and a stator coil, said stator coil connected to a voltage output from said alternator,
a power source,
a first voltage regulator having a first voltage output,
a second voltage regulator having a second voltage output,
a switch which selectively connects one of said first and second voltage regulator in series between one end of said field coil and said power source.

2. The invention as defined in claim 1 wherein said first voltage output is different than said second voltage output.

3. The invention as defined in claim 2 wherein an output voltage from said stator coil has a defined acceptable range and wherein the voltage of said first voltage regulator is equal to a lower threshold of said range plus one third of said range.

4. The invention as defined in claim 3 wherein the voltage of said second voltage regulator is equal to said lower threshold of said range plus two thirds of said range.

5. The invention as defined in claim 1 and comprising a diode electrically connected in series with said first voltage regulator and said field coil.

6. The invention as defined in claim 5 and comprising a second diode electrically connected in series with said second voltage regulator and said field coil.

7. The invention as defined in claim 4 and comprising a third diode electrically connected between said first end of said field coil and a second end of said field coil.

8. The invention as defined in claim 1 wherein said alternator comprises a second field coil, said first voltage regulator being selectively electrically connected to said first mentioned field coil and said second voltage regulator being selectively electrically connected to said second field coil.

* * * * *